United States Patent
Pakula et al.

(10) Patent No.: US 8,836,499 B2
(45) Date of Patent: Sep. 16, 2014

(54) SELF ADAPTING ALERT DEVICE

(71) Applicant: Apple Inc., Cupertino, CA (US)

(72) Inventors: Dave Pakula, Cupertino, CA (US);
Matthew Hill, Cupertino, CA (US);
Ethan Larry Huwe, Perham, MN (US);
Fletcher R. Rothkopf, Cupertino, CA (US); Richard Hung Minh Dinh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/972,708

(22) Filed: Aug. 21, 2013

(65) Prior Publication Data

US 2013/0335217 A1  Dec. 19, 2013

Related U.S. Application Data

(63) Continuation of application No. 12/571,326, filed on Sep. 30, 2009, now Pat. No. 8,552,859.

(51) Int. Cl.
*G08B 23/00* (2006.01)

(52) U.S. Cl.
USPC ........... 340/517; 340/540; 340/541; 340/665; 340/614; 340/635; 340/12.5; 455/550.1; 455/567; 455/574; 455/575.3; 455/566

(58) Field of Classification Search
USPC ......... 340/517, 540, 541, 635, 407, 514, 665, 340/12.5; 455/550.1, 567, 574, 575.3, 566
See application file for complete search history.

(56) References Cited

U.S. PATENT DOCUMENTS

| | | | |
|---|---|---|---|
| 6,408,187 B1 | 6/2002 | Merriam | |
| 6,864,877 B2 | 3/2005 | Braun et al. | |
| 6,954,657 B2 | 10/2005 | Bork et al. | |
| 7,333,604 B2 | 2/2008 | Zernovizky et al. | |
| 7,392,066 B2 | 6/2008 | Haparnas | |
| 7,446,752 B2 | 11/2008 | Goldenberg et al. | |
| 2007/0254627 A1 | 11/2007 | Kikuchi et al. | |
| 2008/0036591 A1 | 2/2008 | Ray | |
| 2008/0132196 A1 | 6/2008 | Soh et al. | |
| 2008/0197901 A1 | 8/2008 | Cruz-Hernandez et al. | |
| 2009/0167542 A1 | 7/2009 | Culbert et al. | |
| 2010/0048256 A1 | 2/2010 | Huppi et al. | |

FOREIGN PATENT DOCUMENTS

| | | |
|---|---|---|
| CN | 201315622 | 9/2009 |
| EP | 1686776 | 8/2006 |
| JP | 2004236202 | 8/2004 |

(Continued)

OTHER PUBLICATIONS

Hasser et al., "Preliminary Evaluation of a Shape-Memory Alloy Tactile Feedback Display," Advances in Robotics, Mechantronics, and Haptics Interfaces, ASME, DSC—vol. 49, pp. 73-80, 1993.

(Continued)

*Primary Examiner* — Tai T Nguyen
(74) *Attorney, Agent, or Firm* — Jennifer Luh

(57) ABSTRACT

Methods and apparatuses are disclosed that allow an electronic device to autonomously adapt one or more user alerts to the current operating environment of the electronic device. For example, some embodiments may include a method comprising providing a plurality of alert devices in an electronic device, determining an operating environment of the electronic device using a sensor of the electronic device, and actuating at least one of the plurality of alert devices that corresponds to the determined operating environment.

16 Claims, 6 Drawing Sheets

(56) References Cited

FOREIGN PATENT DOCUMENTS

| | | |
|---|---|---|
| JP | 2007300346 | 11/2007 |
| JP | 2008108216 | 5/2008 |
| JP | 2008139293 | 6/2008 |
| WO | 2006057770 | 6/2006 |
| WO | 2008075082 | 6/2008 |

OTHER PUBLICATIONS

Hill et al., "Real-time Estimation of Human Impedance for Haptic Interfaces," Stanford Telerobotics Laboratory, Department of Mechanical Engineering, Stanford University, 6 pages, at least as early as Sep. 30, 2009.

SELF ADAPTING ALERT DEVICE

This continuation application claims the benefit of and claims priority to U.S. patent application Ser. No. 12/571,326, U.S. Pat. No. 8,552,859, filed Sep. 30, 2009.

BACKGROUND

I. Technical Field

The present invention relates generally to alert devices in electronic systems, and more particularly to a self adapting alert device.

II. Background Discussion

Electronic devices are ubiquitous in society and can be found in everything from wristwatches to computers. Many of these electronic devices are portable and also include the ability to obtain a user's attention through the use of an alert device. For example portable electronic devices like cellular phones and watches contain alert devices such as vibrating motors, speakers, and/or lights to attract the user's attention. Because of their portable nature, many of these portable electronic devices are made as small as possible by miniaturizing the components therein. As part of this miniaturization effort, the alert devices in the electronic devices are often made as small as possible in order to conserve space. However, these miniaturized alert devices can be problematic for several reasons.

First, these miniaturized alert devices may be inadequate to obtain the user's attention in a variety of different situations. For example, if the user of a cell phone is in an environment where there is a great deal of ambient noise, such as a concert or live sporting event, then the user may be unable to see a visual alert from a miniaturized light on the phone, hear an auditory alert from a miniaturized speaker in the phone and/or unable to detect vibration coming from the phone's miniaturized vibration motor.

Additionally, because of electronic devices often contain slight variations in the way they were manufactured, the actual response of the alert device within the electronic device may vary between electronic devices. In other words, slight variations in the actual manufacturing of an electronic device may cause the electronic device to react differently to the same force driving the alert device. For example, the vibration frequency may vary between phones of the same make and model because of manufacturing tolerance, and therefore, the same amount of vibration from a vibrating motor may unintentionally produce different levels of user alerts.

Thus, methods and systems that adaptively adjust the alert devices within electronic devices to overcome one or more of these problems are desirable.

SUMMARY

Methods and apparatuses are disclosed that allow an electronic device to autonomously adapt one or more user alerts to the current operating environment of the electronic device. For example, some embodiments may include a method comprising providing a plurality of alert devices in an electronic device, determining an operating environment of the electronic device using a sensor of the electronic device, and actuating at least one of the plurality of alert devices that corresponds to the determined operating environment.

Other embodiments may include an electronic device that autonomously adjusts a user alert, the electronic device comprising a storage unit, an error detector couple to the storage unit, a sensor coupled to the error detector, a motor controller coupled to the error detector, and a motor coupled to the motor controller, wherein a reference value stored in the storage unit is varied to achieve a target frequency of the electronic device.

Still other embodiments may include a method of adjusting user alerts in an electronic device, the method comprising determining a current operating environment from a sensor of the electronic device, storing an initial reference value corresponding to an initial target frequency of the electronic device in the current operating environment, and in the event that the user alert is to be optimized, then the method further comprises modifying the initial reference value and storing measurements from the sensor

BRIEF DESCRIPTION OF THE DRAWINGS

The use of the same reference numerals in different drawings indicates similar or identical items.

DETAILED DESCRIPTION

Embodiments of electronic devices are disclosed that allow the electronic device to autonomously observe its current operating condition and adjust its user alerts accordingly. The electronic device may determine its current operating environment (e.g., indoors, outdoors, contained in a purse or bag, etc.) through a series of sensor measurements. Based upon these sensor measurements the electronic device may both select and/or optimize the user alerts to suit the current operating environment. For example, some embodiments may utilize the sensor measurements to determine which of the possible user alerts is best suited to the current operating environment of the electronic device—e.g., if the current operating environment is indoors in a conference room, then the auditory alerts may not be the most suitable user alert in this operating environment. Other embodiments may utilize the sensor measurements to optimize the user alerts. For example some embodiments may include operating a motor to cause the electronic device to vibrate and obtain the user's attention through tactile sensation. In these embodiments, the sensor measurements may be utilized to actively tune the motor such that the electronic device achieves a target frequency that best corresponds to the current operating environment of the electronic device.

Although one or more of the embodiments disclosed herein may be described in detail with reference to a particular electronic device, the embodiments disclosed should not be interpreted or otherwise used as limiting the scope of the disclosure, including the claims. In addition, one skilled in the art will understand that the following description has broad application. For example, while embodiments disclosed herein may focus on portable electronic devices such as cell phones, it should be appreciated that the concepts disclosed herein equally apply to other portable electronic devices such as the IPOD brand portable music player from Apple Inc. In addition, it should be appreciated that the concepts disclosed herein may equally apply to non-portable electronic devices, such as computer equipment (keyboard, mice, etc.) and/or gaming devices (e.g., gaming controllers). Furthermore, while embodiments disclosed herein may focus on optimizing the vibration output of the electronic devices, the concepts disclosed herein equally apply to other forms of user alerts, such as sound devices and/or light devices. Accordingly, the discussion of any embodiment is meant only to be exemplary and is not intended to suggest that the scope of the disclosure, including the claims, is limited to these embodiments.

Figure 1:
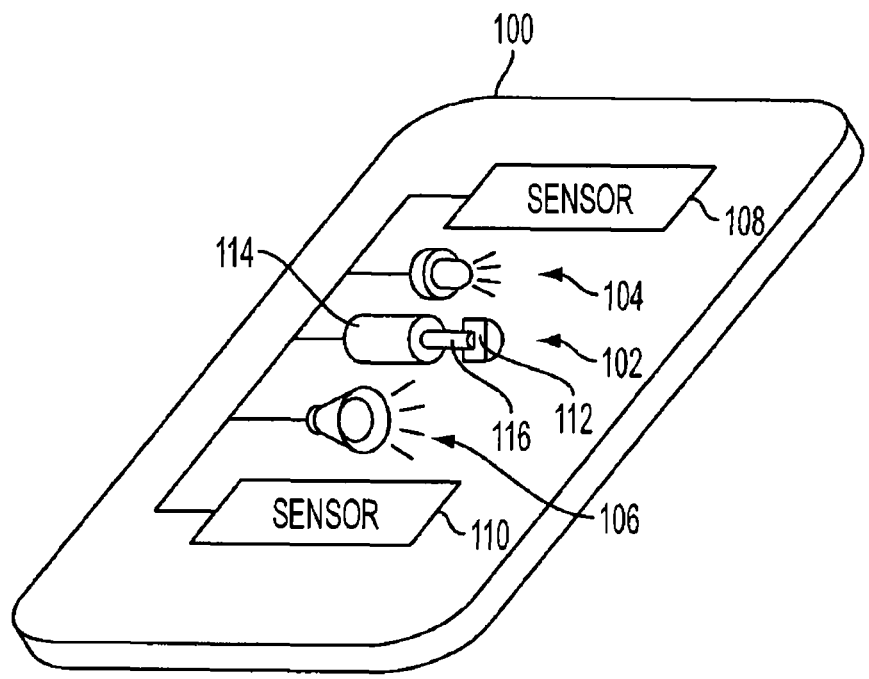
FIG. 1 illustrates an electronic device capable of self adapting one or more of its alert devices to obtain the attention of a user in different environments.

FIG. 1 illustrates an electronic device 100 capable of autonomously adjusting one or more of its alert devices to obtain the attention of a user of the electronic device 100 in different environments. For the sake of discussion, the electronic device 100 is shown in FIG. 1 as a cell phone, such as an IPHONE brand cell phone from Apple Inc. The electronic device 100 may include one or more alert devices capable of obtaining the attention of the user of the electronic device 100, including a vibration motor 102, a light source 104, and/or a speaker 106. FIG. 1 also shows that these alert devices 102, 104, and 106 may be coupled to one or more sensors 108 and 110 located within the electronic device 100. As will be discussed in greater detail below, the sensors 108 and 110 in the electronic device 100 may include devices that measure indications about the environment in which the electronic device 100 is operating. These measurements may include the movement, proximity to the user, location, whether the user is holding the electronic device 100, ambient light levels, and/or ambient noise levels experienced by the electronic device 100 to name just a few.

Figure 2:
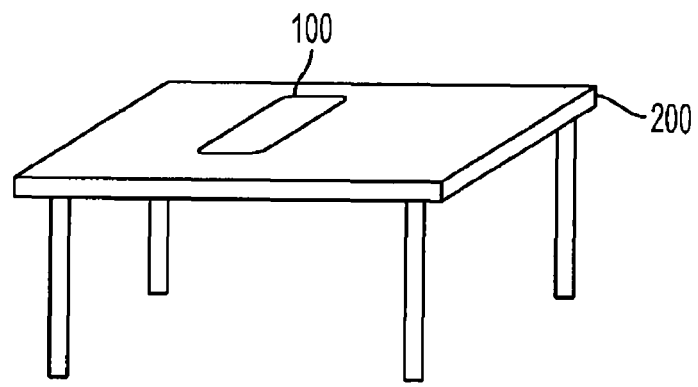
FIG. 2 illustrates one operating environment for the electronic device.
Figure 3:
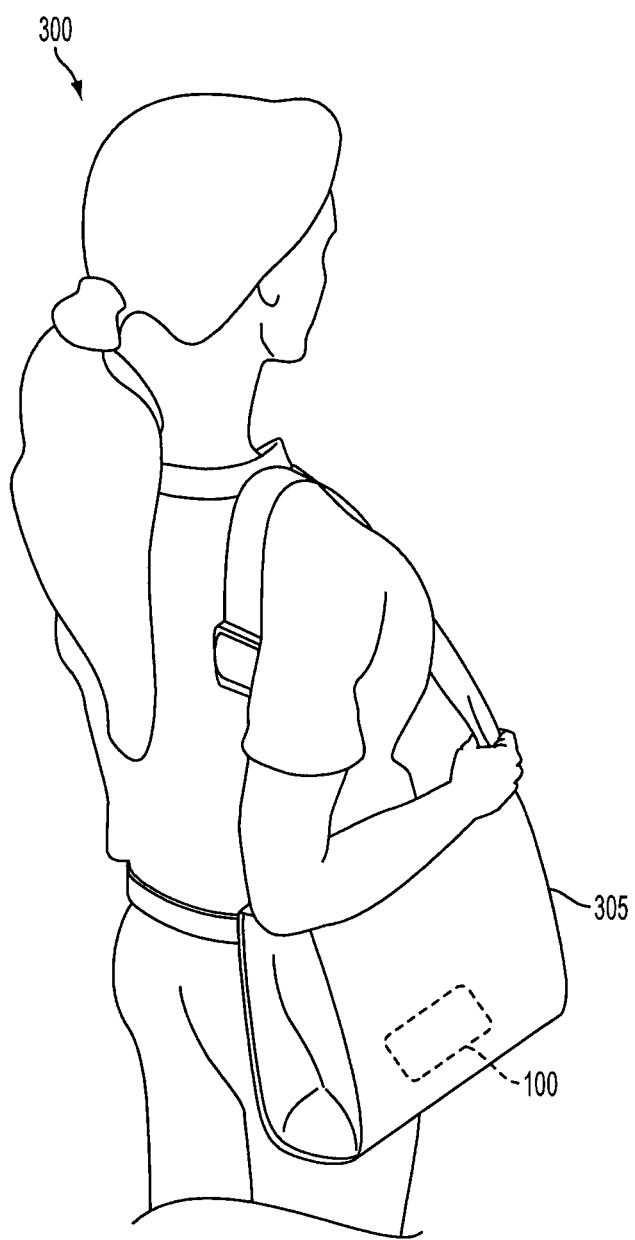
FIG. 3 illustrates an alternate operating environment for the electronic device.

Based these measurements, the electronic device 100 may autonomously decide the most effective way to obtain the user's attention in that particular environment. FIGS. 2 and 3 illustrate two distinct operating environments for the electronic device 100, where the alert used to obtain the user's attention may vary between these two operating environments. Referring first to the operating environment shown in FIG. 2, the electronic device 100 may be lying flat on a table 200 such as may be the case when the user is in a classroom or meeting. If the sensors 108 and 110 are implemented as an accelerometer and microphone respectively, then the electronic device 100 may detect that it is in a classroom or meeting by the sensors 108 and 110 reporting no movement from the accelerometer and/or a relatively low ambient noise level from the microphone. Upon detecting that it is operating in this environment, the electronic device 100 may silence any audible alerts to the user, such as when there is an incoming phone call.

Conversely, FIG. 3 illustrates a user 300 carrying the electronic device 100 in a purse 305 where it may be jostled around. If the sensors 108 and 110 are implemented as an accelerometer and an ambient light sensor (ALS) respectively, then the electronic device 100 in this operating environment may detect that it is in a confined space that is dark by the ALS reporting a relatively low ambient light level and that the electronic device 100 is being moved around by the accelerometer reporting movement. This operating environment may require louder user alerts than the situation shown in FIG. 2, for example, the strength of user alerts, both auditory and vibrations, may be increased in these situations.

Referring again to the electronic device 100 shown in FIG. 1, the motor 102 shown includes an eccentric weight 112 coupled to a motor body 114 via a shaft 116. When an electric signal, such as a voltage signal, is applied to the motor body 114, the shaft 116 begins to rotate causing the weight 112 to move in a substantially orbital path. Because the weight 112 is uneven, as the weight 112 begins to be rotated in this substantially orbital path, the motor 102 begins to vibrate, and as a result, the motor 102 causes the entire electronic device 100 to vibrate. When the electronic device 100 is deployed in different operating environments, the maximum target frequency of the electronic device 100, or frequency at which the entire electronic device 100 experiences its maximum vibration, may vary between different operating environments. For example, comparing the two operating environments shown in FIGS. 2 and 3, the electronic device 100 making physical contact with the table 200 will have a different target frequency than the same electronic device 100 being jostled around in the purse 305. By monitoring the sensors 108 and 110 based upon these measured parameters, the target frequency of the electronic device in these different operating environments may be determined. Furthermore, by actively adjusting the vibration of the motor 102 based upon these measured parameters, the electronic device 100 may be adjusted to achieve this target frequency in different operating environments. That is, the electronic device 100 may actively "tune" itself to its target frequency using measurements obtained from the sensors 108 and 110 and adjusting the motor 102. In the embodiments where the electronic device 100 is a phone, this active adjustment may occur within the period of a single ring of the phone, such that the phone is ringing at its target frequency before the end of the first ring of an incoming call to maximize the chances of obtaining the user's attention. Similarly, when the electronic device 100 is a multi-function device that includes the ability to check electronic mail, this active adjustment may occur within the period of time it takes to notify the user of a new mail event.

Figure 4:
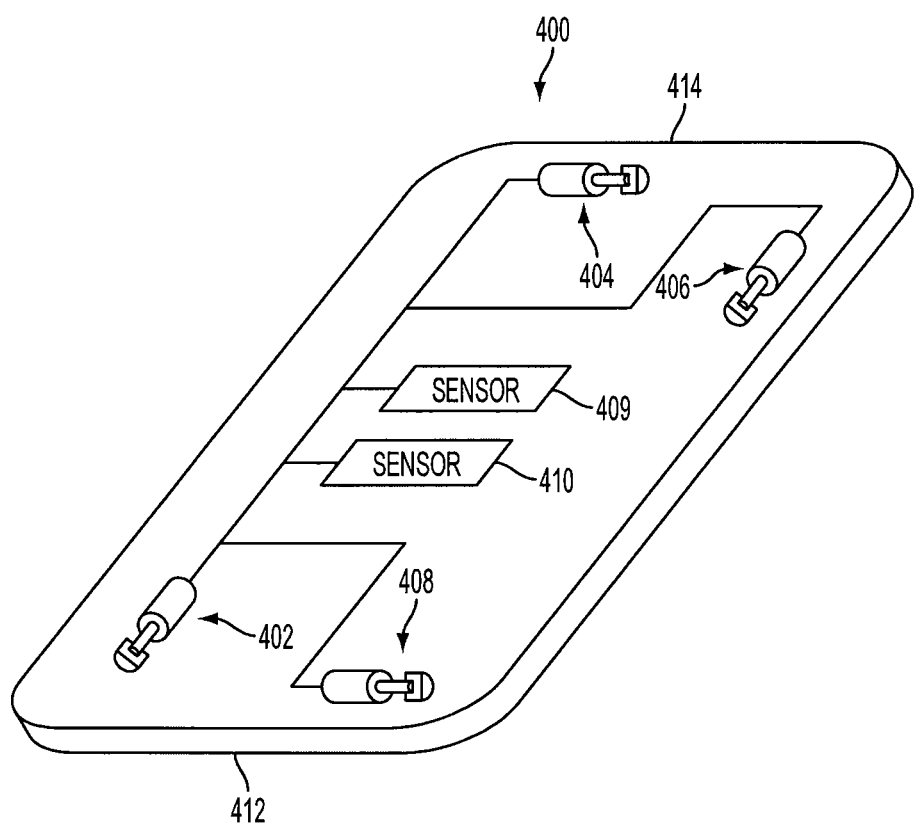
FIG. 4 illustrates an alternate embodiment of an electronic device that includes a plurality of motors.

FIG. 4 illustrates an alternate embodiment of an electronic device 400, which includes a plurality of motors 402-408 coupled to the sensors 409 and 410. As shown, in this embodiment, the plurality of sensors 402-408 may be in different locations within the electronic device 400 so as to vibrate different portions of the electronic device 400. In this embodiment, the target frequency of the electronic device 400 may be achieved by actuating the plurality of motors 402-408 in different patterns, where the pattern of actuating the plurality of motors 402-408 varies according to the different operating environments of the electronic device 400. For example, if the electronic device 400 is located within the purse 305 as shown in FIG. 3 and the sensors 409 and 410 indicate that one end 412 of the electronic device is touching the bottom of the purse 305 and the other end 414 is not touching the bottom of the purse 305, then the motors 402 and 408 may be actuated to achieve the target frequency of the electronic device 400 while the other motors in the plurality 404 and 406 are not actuated. Thus, the electronic device 400 may be tuned to its target frequency in different environments by selectively actuating one or more of the motors within the plurality 402-408.

Figure 5:
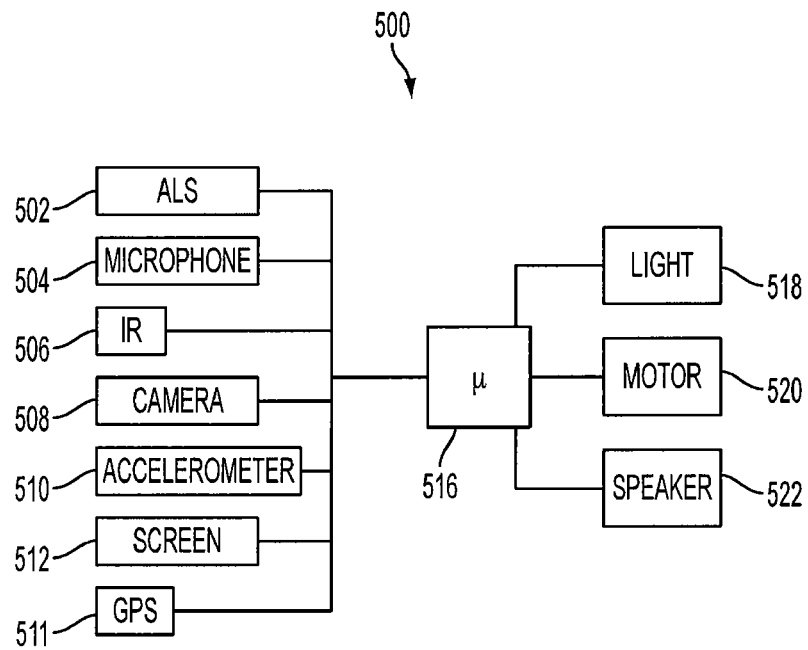
FIG. 5 illustrates a block diagram of an electronic device capable of self adapting one or more of its alert devices to obtain the attention of a user in different environments.

FIG. 5 illustrates a block diagram of an electronic device 500 that may be employed in the embodiments shown above. As shown, the electronic device 500 includes a plurality of sensors 502-512 that couple to a processor 516. These sensors 502-512 may be used alone or in combination to determine the current operating environment of the electronic device 500. The microprocessor 516 may be further coupled to one or more alert devices 518-522.

As was mentioned above, the ALS 502 senses the ambient light of the environment that the electronic device 500 is in and reports this information to the processor 516. When the processor 516 receives this ambient light information, it can modify alert operations of the electronic device 500 accordingly. Thus, in the embodiments where the electronic device 500 is a phone, if ambient light measurements indicate that the level of ambient light is relatively high, then alert mechanisms other than the light 518 may be used to obtain the user's attention, such as the motor 520 and/or speaker 522, because the light 518 may be unperceivable to the user because the ambient light conditions. As was mentioned above, the information from the sensors may be combined such that the ambient light measurement from the ALS 502 may be used in conjunction with other measurements, such as ambient noise level, to detect a current operating environment of the electronic device 500.

The microphone 504 may sample the ambient noise level of the environment that the electronic device 500 is in and report this information to the processor 516. Thus, the microphone 504 may indicate that the ambient noise level is too high for the speaker 522 to obtain the user's attention, and therefore, alert mechanisms other than the speaker 522 may be used to obtain the user's attention, such as the motor 520 and/or the light 518. In the embodiments where the electronic device 500 is a phone, then the microphone 504 may be the microphone used by the user of the electronic device 500 when using the phone.

The infrared (IR) detector 506 may detect a user's proximity to the electronic device 500 and report this information to the processor 516. In some embodiments, the IR detector 506 may include one or more solid state sensors, such as pyroelectric materials, which detect heat from a user's body being near the electronic device 500. In other embodiments, the IR sensor may include a light emitting diode (LED) that emits infrared light which bounces off a user in close proximity to the electronic device 500 and is detected by an IR sensor that is based upon a charge coupled device (CCD), where the CCD may detect reflected IR light emitted by the LEDs. In still other embodiments, a photoresistor may be used in place of or in conjunction with the CCD. Regardless of the actual implementation of the IR detector 506, the IR detector 506 may convey its signal to the processor 516 as an indication of a user's presence near the electronic device 500, and this indication may be used in conjunction with one or more of the other sensors to determine the current operating environment of the electronic device 500.

The camera 508 may capture certain visual queues for use in determining the operating environment of the electronic device 500. In some embodiments, the camera 508 may be integrated within the ALS 502. In other embodiments, the camera 508 may be located on a separate portion of the electronic device 500 and may be used to confirm measurements from one of the other sensors, such as the ALS 502. For example, in the event that the electronic device 500 is implemented as a phone and the ALS 502 is positioned on one side of the phone, such as the face side that the user positions against their head when using the phone, and the camera 508 is positioned on the opposite side of the electronic device 500 as the ALS 502, then the camera 508 may be used to confirm measurements indicating that the phone is in a certain operating environment.

Furthermore, in some embodiments, measurements from the camera 508 may be used to provide additional information regarding the operating environment of the electronic device 500. For example, if the electronic device 500 is implemented as the phone shown in FIG. 2, where the phone is lying face down, and the ALS 502 is located on the face of the phone while the camera 508 is located on the opposite side of the phone, then by the ALS 502 indicating that it is receiving substantially no light while the camera 508 indicates that it is receiving light, then may indicate that the phone is lying face down on the table.

The accelerometer 510 may indicate the general orientation of the electronic device 500. In some embodiments, this indication may be through measurement of a damped mass on an integrated circuit, such as a micro electro-mechanical system (MEMS) For example, the accelerometer 510 may include one or more "in-plane" MEMS accelerometers, which are sensitive in a plane that is parallel to the sensing element (such as the damped mass), and therefore multiple dimension (such as two and three dimension accelerometers) may be formed by combining two or more in-plane accelerometers orthogonal to each other. Other embodiments may utilize out-of-plane MEMS accelerometers, which are sensitive to positional movements in a direction that is in a plane that is perpendicular to the sensing element (sometimes referred to as Coriolis movement). Some embodiments may combine one or more in-plane MEMS sensors with one or more out-of-plane MEMS sensors to form the accelerometer 510. As mentioned above, the accelerometer 510 may be used to determine orientation of the electronic device 500 (such as face up, face down, tilted, etc.) and/or whether the electronic device 500 is being jostled about by the user (such as inside of the purse 305 shown in FIG. 3). By providing the measurements from the accelerometer 510 to the processor 516 in addition to measurements from other sensors, the processor 516 may combine the measurements and confirm of the other sensors. For example, if the combination of the ALS 502 and the camera 508 indicate that the electronic device 500 is lying face down (as discussed above with regard to FIG. 2), then the processor 516 may utilize measurements from the accelerometer 510 to confirm this positional information.

The global positioning system (GPS) sensor 511 may indicate the position of the electronic device 500 with respect to the latitude and longitude coordinates of the Earth as determined by signals from a plurality of geosynchronous satellites orbiting the Earth. Since the GPS sensor 511 may be unable to receive satellite signals while indoors, the GPS sensor 511 may be used to detect whether the electronic device 500 is indoors or outdoors, and the processor 516 may adjust the alerts accordingly.

The capacitive screen sensor 512 may detect whether the user is making contact with the electronic device 500, and/or how much contact the user is making with the electronic device. For example, if the user is holding the electronic device 500 in their pocket, then the capacitive screen sensor 512 may indicate a certain capacitance level associated with the user's body. On the other hand, in the event that the electronic device 500 is located the purse 305 as shown in FIG. 3, then the capacitive screen sensor 512 may indicate a different capacitance associated with the fabric of the purse 305. Also, when the capacitive screen sensor 512 senses substantially no capacitance value, then the electronic device 500 may be on a table 200 as shown in FIG. 2.

Table 1 illustrates how values from the capacitive screen sensor 512 may be confirmed by the other sensors, such as the ALS 502. For example, when the ALS indicates that the ambient light level is low, such as when the phone may be in a pocket or in the purse 305, then the capacitive screen sensor 512 may be consulted by the processor 516 to determine if the capacitance value corresponds to human versus non-human capacitance so that the processor 516 may determine the operating environment an adjust the user alerts accordingly. Similarly, in the event that the capacitive screen sensor 512 indicates that substantially no capacitance is measured, then the ALS 502 may be consulted to determine if the light level is high indicating that the operating environment is on the table 200 in a bright room or, if the light level is low, indicating that the operating environment is on the table 200 in a dark room, such as a night stand. The processor 516 then may adjust the alerts accordingly, such as by silencing alerts from the speaker 522 in the event that the electronic device 500 is on a night stand.

TABLE 1

| | | ALS 502 | |
|---|---|---|---|
| | | High | Low |
| Capacitive Screen Sensor 512 | Full screen, human | | In pocket |
| | Full screen, non-human | | In purse |
| | Nothing | On conference table | On night-stand |

Figure 6:
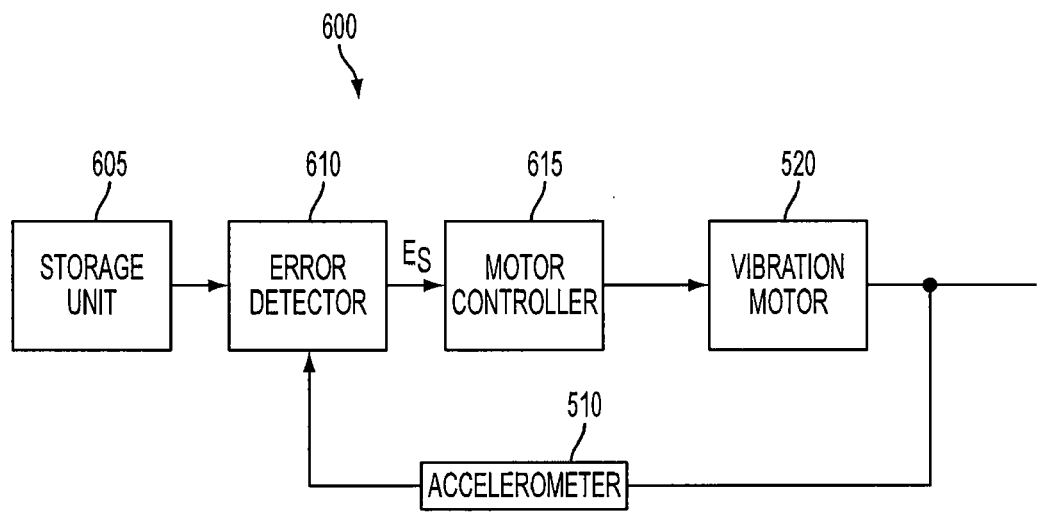
FIG. 6 illustrates a feedback and control system that may allow the electronic device to achieve a target frequency that is customized to the current operating environment.

Referring still to FIG. 5, each of the sensors 502-512 may be used by the processor to optimize the performance of the light 518, the motor 520 and/or the speaker 522 to the operating environment of the electronic device 500. FIG. 6 depicts a block diagram of an illustrative feedback and control system 600 that may be implemented by the electronic device 500 to control the motor 520 such that its movement allows the electronic device 500 to achieve a target frequency that is customized to the operating environment. As shown in block 605 of FIG. 6, the control system 600 may include a storage unit 605 that includes a reference value that is reported to other items in the control system 600. For the sake of discussion, this disclosure will discuss the reference value as based upon an accelerometer measurement, although it should be appreciated that this measurement may be based upon a wide variety of sensors, such as one or more of the sensors 502-512. Also, the reference value in the storage unit 605 may be a combination of measurements from more than one of the sensors 502-512.

The control system 600 may include an error detector 610 coupled to the storage unit 605 and the accelerometer 510. The accelerometer 510 may report its measurements to the error detector 610 in the same form as the reference measurements stored in the storage unit 605. As was mentioned above, measurements from the accelerometer 510 may represent movement of the electronic device 500 in the current operating environment of the electronic device 500, and as a result, the measurements from the accelerometer 510 may be used to measure the target frequency of the electronic device 500. During operation, the error detector 610 may compare the reference value stored in the storage unit 605 with the current measurement from the accelerometer 510 and output an error signal $E_s$.

The error detector 610 may couple to a motor controller 615 and thereby provide the error signal $E_s$ to the controller 615. The controller 615 may utilize the error signal $E_s$ in controlling the input signals to the motor 520, such as by generating a control signal that is proportional to the difference between the reference value stored in the storage unit 605 and the accelerometer 510. As mentioned above, the electrical signal applied to the motor 520 may be a voltage, and therefore, the control signal generated by the motor controller 615 may vary one or more aspects of the voltage that is applied to the motor 520. For example, control of the motor 520 may be accomplished by varying the amplitude, frequency, and/or duty cycle of the voltage that is applied to the motor 520.

In some embodiments, the motor 520 may be controlled using a pulse width modulated (PWM) signal. This PWM signal may allow more robust control of the motor 520 than conventional methods, such as an on/off control. In these embodiments, the PWM signal may be used to initially overdrive the motor 520 to reduce the rise time or 'spin up' for the motor 520 thereby producing a sharper turn on of the motor 520. Similarly, in these embodiments, the PWM signal may be used to underdrive the motor 520, or inductively brake the motor 520, so as to achieve a sharper turn off of the motor 520. This sharper on and off action of the motor 520 may result in more noticeable tactile sensations to a user when using the motor 520 as an alert device.

Figure 7:
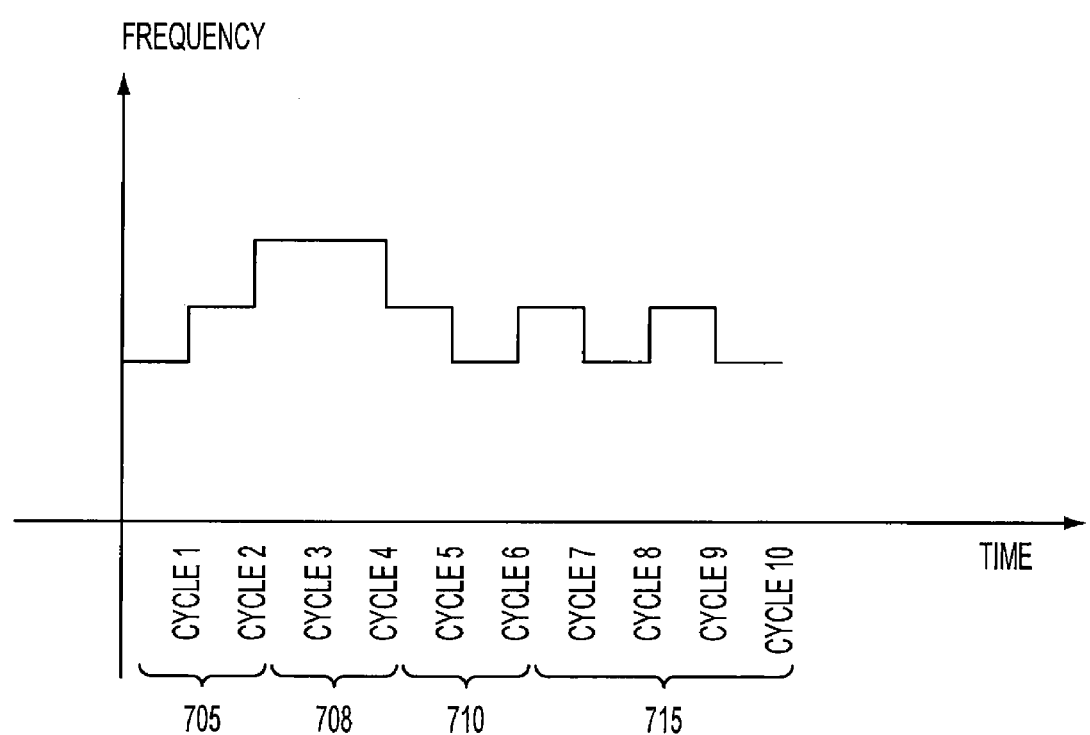
FIG. 7 illustrates a control signal that may be generated by the feedback and control system shown in FIG. 6.

FIG. 7 illustrates varying the frequency of the control signal where the frequency varies with respect to time. Note that the varying frequency may be monotonically increasing during each cycle of the control system 600 (section 705), unchanged during each cycle of the control system 600 (section 708), monotonically decreasing during each iteration of the control system 600 (section 710), or be dithered between two or more values during each cycle of the control system 600 (section 715).

Referring back to the control system 600 shown in FIG. 6 in conjunction with the electronic device 500 shown in FIG. 5, in some embodiments, the storage unit 605, error detector 610, and motor controller 615 may be incorporated into the microprocessor 516. Thus, during operation, the microprocessor 516 may sample values from the accelerometer 510 (which represents movement of the electronic device 500 within its current operating environment) and actively control the motor 520 such that the error signal $E_s$ is minimized and the reference value stored in the storage unit 605 is achieved. The reference value that is stored in the storage unit 605 may be modified autonomously by the electronic device so that the control system 600 is actively tuning itself to this changing reference value. By changing the reference value stored in the storage unit 605, and tracking the measurements from the accelerometer 510 in response to this varying reference value, the target frequency of the electronic device 500 in its current operating environment may be calculated. For example, as the reference value is varied, the reference value that causes the electronic device 500 to achieve maximum resonance in the current operating environment (as measured by the accelerometer 510), may be stored in the storage unit 605.

Figure 8:
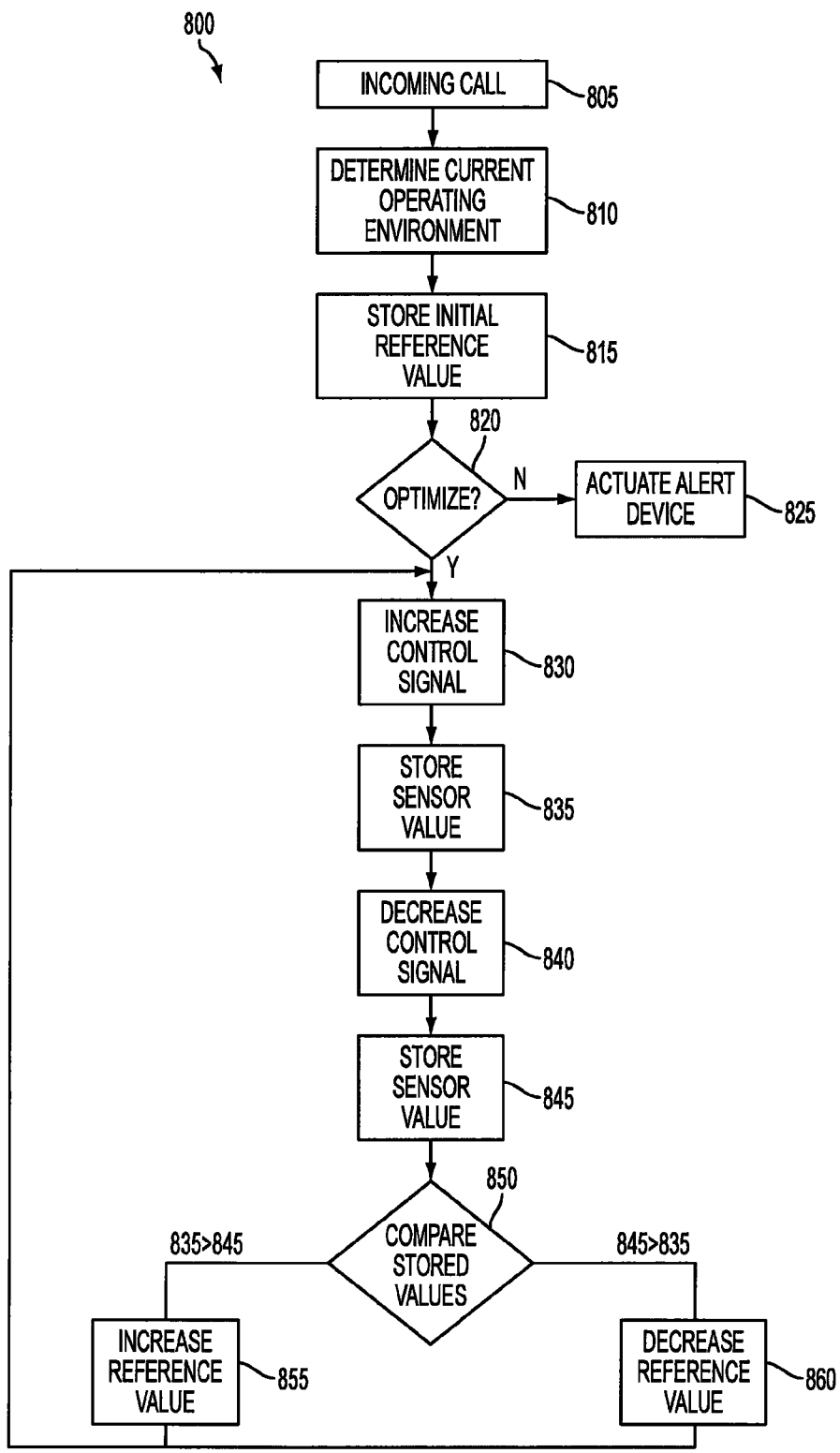
FIG. 8 illustrates operations for determining a reference value corresponding to a maximum target frequency corresponding to a current operating environment of the electronic device.

FIG. 8 illustrates operations 800 for determining a reference value corresponding to a target frequency of the electronic device. The target frequency of the electronic device may be a resonant frequency of the electronic device 500 in its current operating environment, or alternatively, may be a frequency of the device that maximizes a user's perception of the alert. It should be appreciated that the operations shown in FIG. 8 are illustrative, and that other operations for determining a reference value may be performed in other embodiments. The operations 800 are discussed herein in the context of the electronic device 500 being a phone that is receiving an incoming call, however, the operations 800 may be applied in other contexts, such as in the context of a personal digital assistant (PDA) alerting a user to an appointment for example.

Referring now to FIG. 8, block 805 shows the electronic device 500 receiving an incoming call. Generally, the duration of a single ring for an incoming call may be five seconds and the phone may ring for a total of five rings before being transferred to voicemail, or twenty five seconds. In some embodiments, the operations 800 may be triggered when the electronic device 500 beings to ring on the first ring and complete within this first ring, and therefore the block 805 occur on first ring. In other embodiments, the operations 800 may occur on a subsequent ring and complete within that subsequent, and therefore the block 805 may be a subsequent ring. In still other embodiments, the operations 800 may begin at the beginning of the first ring and complete before the phone transfers the call to voicemail.

Once the electronic device 500 receives an incoming call, the electronic device 500 will detect the current system state per block 810. For example, the microprocessor 516 may observe the values of one or more of the sensors 502-512 to determine their values, and as was discussed above, based upon one or more of these measurements, the electronic device 500 may predict the operating environment of the electronic device (e.g., on a table as shown in FIG. 2 versus in the purse 305 as shown in FIG. 3).

Next, in block 815, the initial reference value may be loaded into the storage unit 610. The initial reference value to be stored may correspond to an initial estimation of the reference value that matches the current operating environment. For example, momentarily to FIGS. 3 and 6, if the processor 516 determines that the phone is in the purse 305, then the processor 516 may consult a lookup table to determine a predetermined reference value to be stored in the storage unit 605 such that the initial target frequency achieved by the control system 600 generally corresponds to the phone being located in the purse 305. This initial target frequency stored in the storage unit 605 may be optimized by subsequent operations.

Referring back to FIG. 8, block 820 includes a decision block to determine whether the initial reference value is to be optimized. In the event that no optimization is desired, such as when the control system 600 determines that the initial reference value achieves a target frequency that is within a threshold of a predetermined maximum target frequency, then control may flow to block 825, where the motor 520 may be actuated corresponding to the initial reference value.

On the other hand, in the event that the block 820 determines that optimization is desired, then a dithering process may be utilized to determine the target frequency of the electronic device 500. This dithering process may begin in block 830 where the control signal provided to the motor 520 may be increased, for example, by increasing the frequency as illustrated in the section 705 of FIG. 7. In block 835, each time the control signal is increased by the controller 615, this value may be stored for determination of the target frequency of the electronic device 500. Next, in block 840 the control signal provided to the motor 520 may be decreased, for example, by decreasing the frequency with the controller 615 as illustrated in the section 710 of FIG. 7. In block 845, each time the control signal is decreased, this value may be stored for determination of the target frequency of the electronic device 500.

Next, in block 850, the microprocessor 516 may compare the values stored in blocks 835 and 845 and adjust the reference value in the storage unit 605 accordingly. For example, if the value stored during block 835 is greater than the value stored during block 845, then increasing the control signal per block 830 may result in the electronic device 500 getting closer to its target frequency than decreasing the control signal per block 840. Thus, the controller 615 may increase the frequency of the control signal to the motor 520 by increasing the reference value stored in the storage unit 605 per block 855 and then control may flow back to block 830 where the dithering process begins again.

Likewise, if the value stored during block 845 is greater than the value stored during block 835, then decreasing the control signal per block 840 may result in the electronic device 500 getting closer to its target frequency than increasing the control signal per block 830. Thus, the controller 615 may decrease the frequency of the control signal to the motor 520 by increasing the reference value stored in the storage unit 605 per block 860 and then control may flow back to block 830 where the dithering process begins again.

The dithering operations shown in blocks 830-845 are merely illustrative of the operations that may be implemented in determining the maximum target frequency of the electronic device 500 in its current operating environment and the operations 800 shown in FIG. 8 may vary in other embodiments. For example, in some embodiments, there may be a disproportionate number of increases (block 830) in the control signal compared to decreases (block 840) in the control signal or vice versa. Also, in some embodiments, instead of modifying the frequency of the control signal, other portions of the control signal, such as the duty cycle or amplitude of the voltage, may be modified during the dithering process.

In still other embodiments, the maximum target frequency may be determined by stepping through reference values incrementally. For example, the reference value stored in the storage unit 605 may be substantially zero (e.g., on the order of several hertz) and this reference value may be stepped up from this initial value to a maximum reference value. As this reference value is stepped and the control system 600 reacts to this changing reference value, the measurement of the accelerometer 510 may be stored by the processor 516 in order to find a maximum target frequency of the electronic device 500. By stepping through a range of reference values in this manner, the processor 516 may determine if there are multiple harmonic target frequencies in the target frequency spectrum of the electronic device 500 and determine which of these harmonics produces the largest target frequency of the electronic device 500.

Because one or more characteristics of the motor 520 may vary as a function of temperature (e.g., the electrical resistance of windings in the motor may increase with temperature), wear (e.g., the brushes that commutate the windings in the motor 520 may have an increasing the electrical resistance over time), and/or friction (e.g., the internal bearing structures of the motor 520 may have an increase in the amount of friction over time, causing the motor to spin more slowly in response to applied voltage). These characteristics may include macro scale changes due to aging and wear and/or micro scale changes due to temporary heating in a hot car or due to the generation of heat in the motor windings during operation. Using one or more of the above identified methods, the motor 520 may be operated in such a manner so as to counteract one or more of these effects. For example, using a PWM control signal, in conjunction with measurements from the one or more sensors, changes in performance of the motor 520 as a function of time may be compensated for. Such measurements could be inferred indirectly from measurements of the armature resistance of the motor 520 (e.g., to compensate for temperature/brush wear) or directly from measurements of motor speed at a known duty cycle (e.g., using the accelerometer 510). In addition, while these degradations in performance may be compensated for, they may also be used to trigger a repair or diagnostic history to be communicated to the user, or to the manufacturer or seller of the device.

What is claimed is:

1. An electronic device, comprising:
a plurality of sensors, wherein the plurality of sensors detect an operating environment of the electronic device;
a plurality of alert mechanisms, wherein the electronic device automatically adjusts operation of at least one of the plurality of alert mechanisms based on measurements from at least one of the plurality of sensors, wherein the plurality of sensors comprises an accelerometer and the at least one of the plurality of alert mechanisms comprises a first motor and a second motor; and
a control system that is coupled to the first and second motors, wherein the control system is configured to actuate the first motor and the second motor in a pattern based on the operating environment of the electronic device.

2. The electronic device defined in claim 1, wherein the first and second motors are located at respective first and second portions of the electronic device and wherein the plurality of sensors are configured to detect whether the electronic device contacts an external object at the first and second portions of the electronic device.

3. The electronic device defined in claim 2, wherein the plurality of sensors are configured to detect which portion of the first and second portions of the electronic device contacts the external object in response to detecting that the electronic device contacts the external object and wherein the control system actuates only the motor located at the detected portion of the electronic device.

4. The electronic device defined in claim 1, wherein the control system is configured to operate the first and the second motors at a first frequency for a first operating environment and wherein the control system is configured to operate the first and the second motors at a second frequency for a second operating environment.

5. The electronic device defined in claim 1, wherein the plurality of sensors are configured to detect the operating environment by measuring at least one selected from the group consisting of: movement, proximity to user, location, whether the user is holding the electronic device, ambient light levels, and ambient noise levels.

6. An electronic device, comprising:
a sensor that gathers measurements;
a plurality of alert mechanisms; and
a processor that identifies an operating environment of the electronic device from the measurements gathered by the sensor, wherein the processor adjusts operation of the at least one of the plurality of alert mechanisms based on the identified operating environment of the device, wherein the at least one of the plurality of alert mechanisms comprises a light source.

7. The electronic device defined in claim 6, wherein the sensor comprises a microphone and wherein the microphone samples the ambient noise level of the operating environment and reports the sampled ambient noise level to the processor.

8. The electronic device defined in claim 7, wherein the at least one of the plurality of alert mechanisms comprises a speaker that is coupled to the microphone and wherein the processor is configured to silence any alerts through the speakers in response to receiving an ambient noise level that is below a given threshold from the microphone.

9. The electronic device defined in claim 8, wherein the at least one of the plurality of alert mechanisms comprises a motor and wherein the processor is further configured to actuate the motor in response to receiving the ambient noise level that is below the given threshold from the microphone.

10. The electronic device defined in claim 8, wherein the processor is further configured to actuate the light source in response to receiving the ambient noise level that is below the given threshold from the microphone.

11. An electronic device, comprising:
a plurality of sensors that gathers sensor data;
an alert device; and
a processor that automatically adjusts operation of the alert device based on the gathered sensor data, wherein the plurality of sensors comprises first and second sensors, wherein the first sensor gathers a first type of sensor data, and wherein the second sensor gathers a second type of sensor data, wherein the processor is configured to automatically adjust operation of the alert device based on the first and second types of sensor data.

12. The electronic device defined in claim 11, wherein the first sensor comprises an ambient light sensor that measures an ambient light level, wherein the second sensor comprises a capacitive sensor that measures a capacitance value, and wherein the processor is configured to use the ambient light level and the capacitance value to detect an operating environment of the electronic device.

13. The electronic device defined in claim 12, wherein the processor is further configured to detect whether the ambient light level is below a given threshold and whether the capacitance value corresponds to a human capacitance value.

14. The electronic device defined in claim 13, wherein the processor is further configured to detect that the electronic device is in a dark room on a nightstand in response to detecting an ambient light level that is below the given threshold and a capacitance value that is substantially nothing, and wherein the processor is further configured to silence the alert device in response to the processor detecting that the electronic device is in a dark room on a nightstand.

15. The electronic device defined in claim 13, wherein the processor is further configured to detect that the electronic device is in a pocket of a user in response to detecting an ambient light level that is below the given threshold and a capacitance value that corresponds to a human capacitance value, wherein the alert device comprises a motor, and wherein the processor is configured to actuate the motor to vibrate the electronic device at a target frequency in response to detecting that the electronic device is in a pocket of a user.

16. The electronic device defined in claim 13, wherein the processor is further configured to detect that the electronic device is in a purse in response to detecting an ambient light level that is below the given threshold and a capacitance value does not correspond to a human capacitance value, wherein the alert device comprises a motor, and wherein the processor is configured to actuate the motor to vibrate the electronic device at a target frequency in response to detecting that the electronic device is in a purse.

* * * * *